P. WIEDERHOLD.
POWER AND HAND STEERING MECHANISM FOR TRACTORS.
APPLICATION FILED AUG. 17, 1917.
1,305,325.
Patented June 3, 1919.
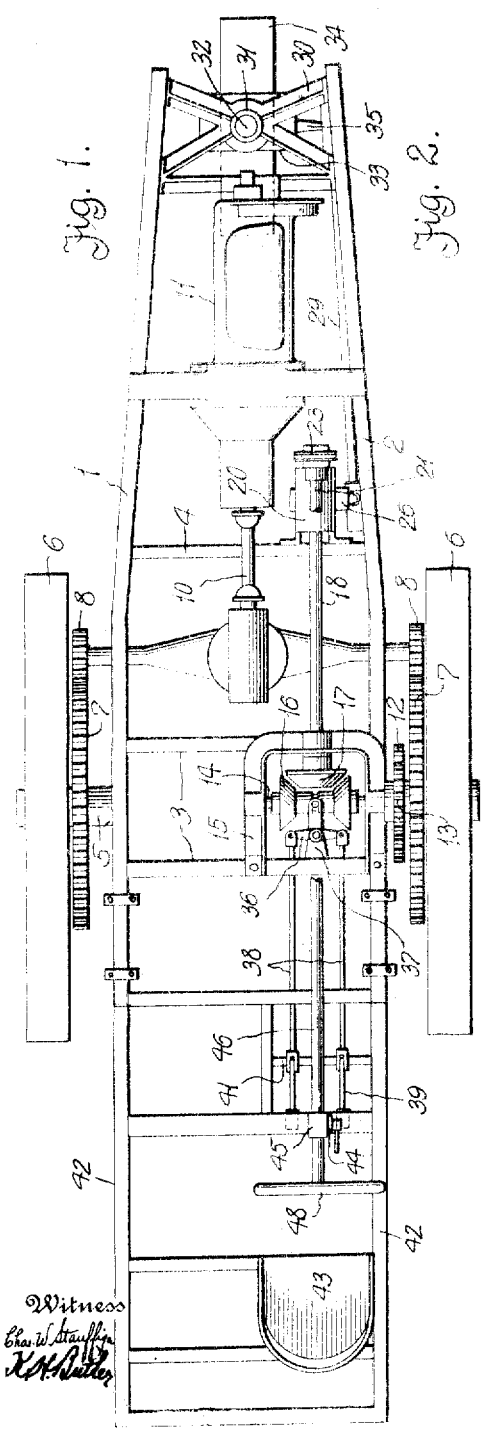
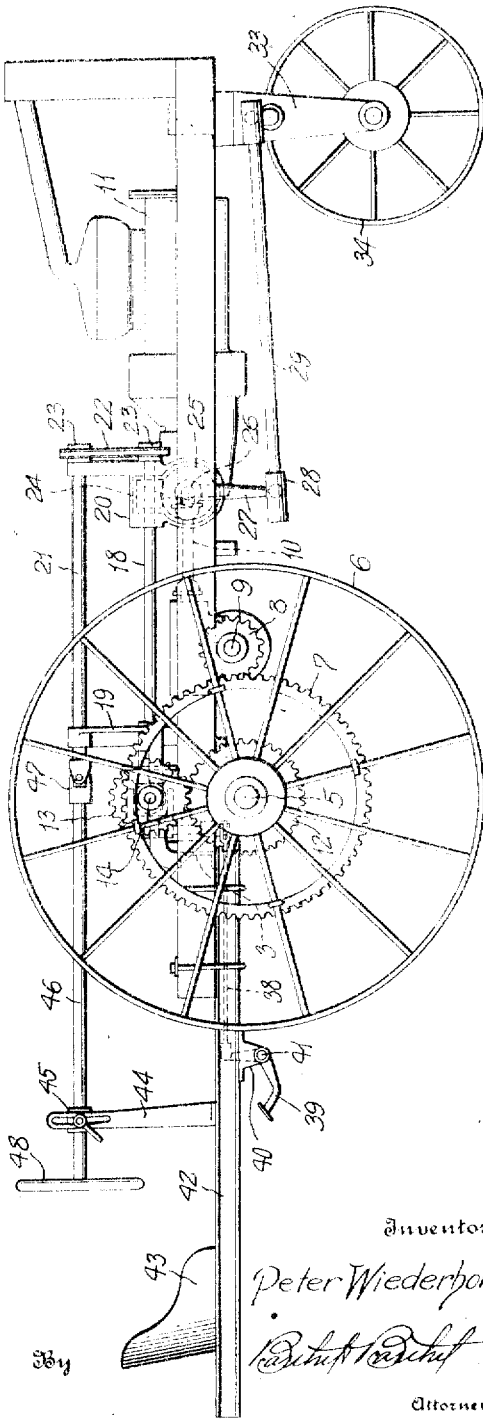
Inventor
Peter Wiederhold,

UNITED STATES PATENT OFFICE.

PETER WIEDERHOLD, OF DETROIT, MICHIGAN.

POWER AND HAND STEERING MECHANISM FOR TRACTORS.

1,305,325.   Specification of Letters Patent.   Patented June 3, 1919.

Application filed August 17, 1917. Serial No. 186,683.

*To all whom it may concern:*

Be it known that I, PETER WIEDERHOLD, a citizen of the United States of America, residing at Detroit, in the county of Wayne and State of Michigan, have invented certain new and useful Improvements in Power and Hand Steering Mechanism for Tractors, of which the following is a specification, reference being had therein to the accompanying drawings.

In order that the hands may be used for other purposes than steering tractors, I have devised a power steering apparatus that may be controlled either by the hands or the feet and when controlled by the feet, the hands may be used for adjusting, regulating or controlling farm implements and machinery attached to the tractor.

The power and hand steering apparatus has been designed for a tractor having a rear overhanging frame under which farm implements may be operated, the overhanging frame accommodating the operator who may steer the tractor by the feet and adjust the farm implements by hand.

The apparatus and tractor by which I attain the above and other results will be hereinafter more fully considered and then claimed, and reference will now be had to the drawings, wherein Figure 1 is a plan of a tractor in accordance with my invention; and Fig. 2 is a side elevation of the same.

In the drawing, the reference numerals 1 and 2 denote the side frames of a tractor, and these frames are connected by transverse members, some of which are designated 3 and 4. The side frames 1 and 2, contiguous to the rear ends thereof, have rotatable axles or shafts 5 for tractor wheels 6 and at the inner sides of said wheels are large gear wheels or circular racks 7 meshing with the gear wheels or pinions 8 on the ends of the differential shaft 9 driven by the drive shaft 10 of a power plant 11 located at the forward ends of the frames 1 and 2. The power plant 11 includes an engine, ignition and cooling systems, transmission and clutch, and such other appurtenances as are essential for operating the tractor.

One of the tractor wheels 6, preferably that wheel adjacent the frame 2, has an additional gear wheel 12 between the gear wheel 7 and the frame 2 and meshing with the gear wheel 12 is another gear wheel 13 mounted on a shaft 14, journaled in a bearing frame 15 on the transverse member 3. Slidable on the shaft 14 and adapted for rotation therewith is a double cone friction drive 16 and either of the cones is adapted to engage and impart movement to the friction cone pulley 17 on a forwardly extending shaft 18 journaled in bearings 19 and 20, carried by one of the transverse members 3 and the transverse member 4. These bearings also support a hand operated shaft 21, which is located directly above the shaft 18 so that said shafts may be operated in synchronism through the medium of a sprocket chain 22 trained on sprocket wheels 23 on the forward ends of the shafts 18 and 21.

The shaft 18 within the bearing 20, has a worm 24 meshing with the spur wheel 25 mounted on a shaft 26 journaled in the bearing 20, the shaft 26 being disposed at right angles to the shaft 18. On one end of the shaft 26 is a crank 27 having a ball and socket connection 28 with a reach rod 29.

At the forward ends of the frames 1 and 2 is a cross frame 30 having a central bearing 31 for a king bolt 32 carried by a front truck 33. The front truck is preferably in the form of a yoke having a single wheel 34 and the side of the front truck is provided with a rigid crank 35 connected to the forward end of the reach rod 29. It is therefore possible to steer or turn the front truck by rotating either of the shafts 18 or 21, the former being a power shaft adapted to be driven when one of the cones of the cone drive engages the cone 17.

To shift the cone drive 16, a three arm bell crank 36 is employed and pivoted on a bracket 37, carried by one of the transverse members 3 adjacent the cone drive. One of the arms of bell crank 36 loosely engages the cone drive so as to slide the same on the shaft 14 and shift one of the cones thereof into engagement with the cone 17. Pivotally connected to the other arms of the bell crank 36 are rods 38 having the rear ends thereof pivotally connected to a treadle or bell crank 39, supported by brackets 40 and a shaft 41 from an extension frame 42. The extension frame is connected by U-bolts or other fastening means to the inner ends of the tractor frames 1 and 2, and said extension frame has a seat 43 for the operator of the tractor.

On the extension frame 42 is an upright 44 having an adjustable bearing 45 for a hand steering rod 46. The forward end of the hand steering rod 46 is connected to the rear end of the shaft 21 by universal joints 27 and the rear end of the rod 46 has a hand wheel 48. The hand wheel 48 is in proximity to the seat 43 and an operator on the seat 43 may steer the tractor by hand or by the feet or the treadle 49. An adjustable bearing 45 permits of the hand steering rod 46 being positioned convenient to the operator, and should the operator desire to manually control farm implements below the extension frame 42, the tractor can be steered by power.

It is thought that the operation and utility of the hand and power steering mechanism will be apparent, and while in the drawing there is illustrated a preferred embodiment of my invention, it is to be understood that the structural elements are susceptible to such variations and modifications as fall within the scope of the appended claims.

What I claim is:—

1. In a three-wheel tractor, the combination of a main frame, a power plant, a front steering truck, wheels coöperating with said front steering truck in supporting said main frame, and driven from said power plant, a worm and gear adapted for steering said front truck from said driven wheels, a longitudinal shaft for operating said worm, treadle actuated clutch adapted for controlling the operation of said worm shaft from said driven wheels, and hand operated shaft above said worm shaft and connected thereto and adapted for actuating said worm and gear independent of said treadle and said wheels.

2. In a tractor, the combination with a main frame, an extension frame carried thereby, and a power plant carried by said main frame operating said tractor, of steering means for said tractor adapted to be either hand operated or operated from said power plant, said means comprising parallel hand and power shafts above said main frame, means connecting the forward ends of said shafts for operation in synchronism, a treadle actuated clutch associated with one of said shafts controlling the operation of said shafts from said power plant, and adjustable means connected to the other shaft, and extending above said extension frame adapted for actuating both of said shafts by hand.

In testimony whereof I affix my signature in the presence of two witnesses.

PETER WIEDERHOLD.

Witnesses:
KARL H. BUTLER,
ANNA M. DORR.